Figure 1:
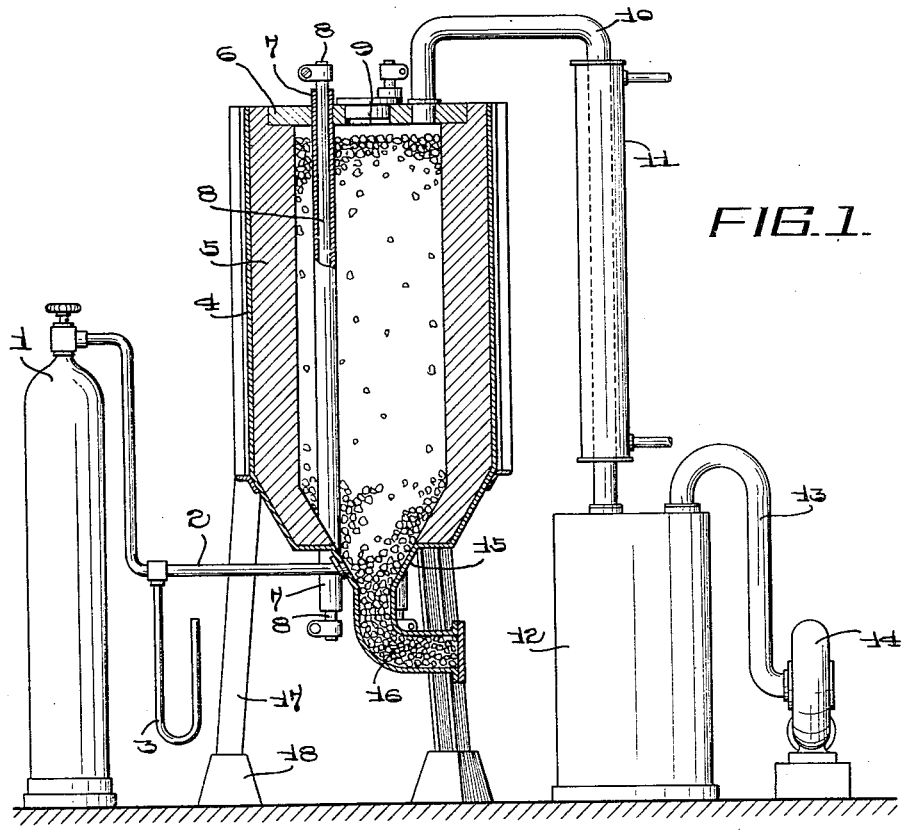
Figure 2:
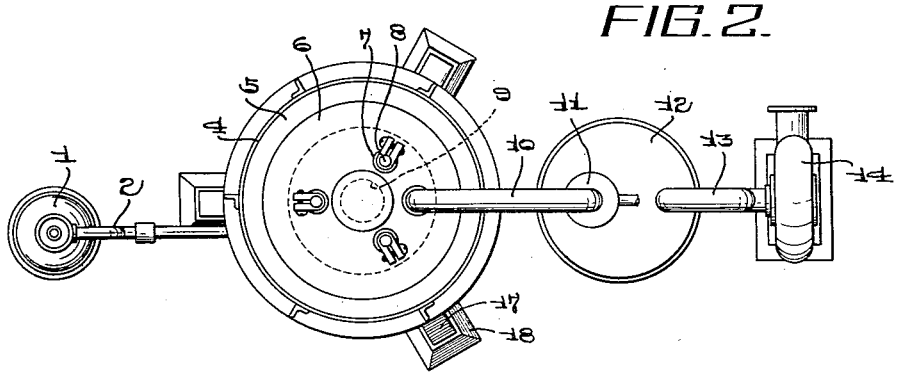

United States Patent Office 2,777,756
Patented Jan. 15, 1957

2,777,756

PROCESS FOR MANUFACTURING TITANIUM TETRACHLORIDE AND ARRANGEMENT THEREOF

Kenji Anazawa, Amagasaki, and Eiichi Tsuruta, Nishinomiya, Japan, assignors to Furukawa Electric Co., Ltd. and Furukawa Mining Co., Ltd., Tokyo, Japan Application March 2, 1954, Serial No. 413,676

Claims priority, application Japan August 13, 1953

1 Claim. (Cl. 23—262)

This invention relates to a process and arrangement for producing titanium tetrachloride.

It is already known that there is a process for producing titanium tetrachloride in which more than two graphite electrodes are projected laterally in the electric furnace lined with chlorine and heat resistive material, briquettes made of mixture of titanium oxide and carbon materials being filled between said projectures to be heated as resistance bodies while powder or briquettes mixed with titanium oxide and carbon are fed into the upper part thereof, to which chlorine is introduced from below to produce TiCl₄, i. e. a process as mentioned in the "Iron Age," vol. 170, No. 15, p. 262-3; or a suggested process in which a large resistance body of carbon electrode is provided at the center of a vertical electric furnace into which the powder or briquettes mixed with titanium oxide and carbon are fed and then chlorine is introduced to obtain titanium tetrachloride.

The former of those two methods, though it is well known as an industrial process, has disadvantages that there are uneven heating and too much consumption of electric power due to the fact that the heating body is composed of the mixture of titanium oxide and carbon materials filled between more than two laterally projected electrodes, resulting in restricting the amount of production of titanium tetrachloride per unit cross section and unit hour.

On the other hand, the latter has also disadvantages that it is difficult of even heating in a large furnace and the resistance of carbon electrode is short-lived due to corrosion of the chlorine.

In an effort to eliminate the defects described above, we have succeeded in accomplishing the invention. According to this invention, the manufacture of titanium tetrachloride is carried out by using an electric furnace lined with chlorine and heat resistive material, in the reaction chamber of which being vertically mounted more than two resistance bodies of silicon carbide or graphite covered by a quartz tube, and by proper adjusting of three elements of operation, namely, velocity of filling briquettes mixed of titanium oxide material and reducing agent, velocity of discharging reaction residues and current velocity of the chlorine.

The characteristics of this invention will be enumerated as follows:

1. The heating body of silicon carbide or graphite is covered by a quartz tube and consequently the chlorine resistibility thereof is markedly strengthened. The heating body will be much longer lived, as it is used at about 900° C. and with a relatively lighter load as such.

Furthermore its thermal efficiency is also remarkably high owing to the fact that the heating body is vertically mounted direct in the reaction chamber.

2. In the case where the chlorine is introduced at the high temperature into the layer of powder or briquettes mixed of titanium oxide and carbon to produce titanium tetrachloride, it is theoretically possible that, if the layer of raw material is thicker and the chlorine passes therein in the largest possible amount, titanium tetrachloride will be obtained with more yield per unit hour of the furnace.

It is common in the method heretofore practised that, when the thickness of the material layer and the supply of chlorine increase beyond a certain extent, the passing of chlorine through the layer of powder produced by crumbling of the raw material briquettes becomes localized, forming so-called tunnel through which the chlorine flows. This lowers considerably the efficiency of chlorination. From above it is apparent that a limitation is naturally set to the thickness of the material layer and also the circulation of chlorine cannot be increased, so that it cannot be expected much of the increased production of titanium tetrachloride per unit cross section and unit hour of the furnace.

On the contrary, this invention relieves said tunnel action exceedingly because of the provision of more than two quartz pipes covering the heating bodies in the reaction chamber and consequently increases the production of titanium tetrachloride per unit cross section and unit hour of the furnace. We have made an experiment in which the raw material briquettes of titanium oxide were filled in a quartz pipe with inner diameter of about 10 cm. The pipe was subsequently heated from the outside and then the chlorine was introduced thereinto for chlorination. By this experiment we have confirmed that despite of using a pipe extending over two meters and feeding the chloride at high speed said tunnel phenomenon hardly occurred. As the electric furnace according to the invention is considered to be the one consisting of an assembly of small pipes partitioned by quartz pipe, it is clear that such tunnel phenomenon will hardly take place.

3. As indicated above, it is clear that, by using an electric furnace where the silicon carbide or graphite heating bodies covered by quartz tubes are provided vertically in the reaction chamber, titanium tetrachloride is manufactured more economically and in much simpler way than in the known method. We have made a further experiment with chlorine feeding at the maximum speed and at the same time on a semi-industrial scale. As a result we have recognized the extraordinary rise of temperature in the furnace. The temperature did not cease the upward tendency in spite of cut-off of electric current for heating and went up even to 1300° C. in the furnace, and in particular, in the most active part thereof where it was generally operated to the limit of 900° C. As seen from the following reaction formula (Gmelin: Handbuch der anorg. chem., "Titanium," Aufi. 1951, s. 92.), $$TiO_2 + 2Cl_2 + C = TiCl_4 + CO_2 + 52 Kcal$$
$$TiO_2 + 2Cl_2 + 2C = TiCl_4 + 2CO + 10.9 Kcal$$

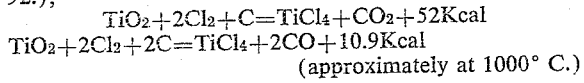

(approximately at 1000° C.)

the formation of titanium tetrachloride in the above case is a low exothermic reaction which is hardly a serious matter except in the case where extremely rapid reaction is effected on a big scale. The case as we experimented in almost an industrial scale and with the highest possible velocity of the chlorine has shown a striking effect of the reaction heat so that if the temperature goes up to 1300° C. the quartz tube would be damaged.

In order to overcome the difficulties we made further studies. The result was that it became almost unnecessary to use the electricity for heating by utilization of the reaction heat. In other words, continuous operation for a long time could be carried out without spending of the electric power for heating except that for preheating of the chlorination furnace.

It is now possible to carry out the operation in such manner that when once the reaction of chlorination becomes active, three elements, i. e. the velocity of feeding raw material briquettes, the velocity of discharging non-reactive residues and the velocity of chlorine current, are properly adjusted so as to effect all the time the most active reaction for chlorination in the part below the middle of the furnace and thereby to maintain an uniform temperature as required, for example, about 900° C., so that quartz tube will not be damageable. Consequently it turns out that the chlorination reaction occurs most effectively while the heating body stands good for a long use. Further, the life of the furnace including the linings and quartz tubes becomes longer. The working of it is a simple matter and the capacity is larger for unit volume.

This invention will now be described with reference to the accompanying drawing.

Referring to the drawing, the chlorine gas flows from a vessel 1 filled with liquid chlorine and passes through a conduct pipe 2 provided with a manometer 3 and through the lower part of the chlorination furnace into the furnace. The chlorination furnace is provided with an iron case 4, the inside of which being lined with fire bricks 5. At the upper part thereof there is provided with a cover 6 made of fire-proof material and at the lower part an apparatus for discharge of the residues, comprising a conical funnel 15 and an iron pipe 16. In the furnace it is equipped with more than two carbonic heating bodies 8 covered by a quartz tube 7. At first the temperature goes up gradually by electric heating, whilst the oxidation is prevented by a step such as filling of carbonic acid gas in the furnace filled with raw material briquettes. In case of titanium oxide being the principal raw material, the chlorine is introduced into the furnace when it comes to about 600° C. therein, and then the reaction occurs between the briquettes and the chlorine. The titanium tetrachloride thus obtained enters a hole of the cover 6 and then a pipe 10, and condenses while in passing through an air- or water-cooled condenser 11 to be collected in a receiver 12, whilst the gas is discharged through a pipe 13 and by means of a pumping apparatus 14 or other proper steps. Waste gases containing a little amount of titanium tetrachloride and the chlorine can pass, if desired, through a water scrubber and an apparatus for manufacturing the bleaching powder in order to make these gases harmless and, at the same time, to recover the effective components. 17 is a support of the furnace, mounted on a concrete base 18. Embodiments of the invention are further shown as follows:

*Example 1*

In the chlorination furnace there are provided a reaction chamber of 50 cm. in inner diameter and 1.6 m. in height and three heating bodies of silicon carbide of 30 mm. in diameter and 2 m. in length which are covered by a quartz tube.

The powder mixed in the ratio of 80 titanium oxide to 20 coal dust was added with a little amount of 1% wheat flour solution and then compressed to form a briquette.

Those dried briquettes of 300 kg. were charged in the furnace and heated up to 600° C., during the time the carbonic acid gas was supplied. After substituting the chlorine for said carbonic acid gas, the furnace was working for 20 days.

During the period the chlorine of 14 tons and the briquettes of 8.9 tons were used with result that the titanium tetrachloride of 16 tons in more than 99% purity was obtained. The consumption of electric power was 350 kwh. It shows that 0.9 ton chlorine, 0.44 ton titanium oxide and 22 kwh. power are used for 1 ton titanium tetrachloride and that the percentages of the utilized chlorine and titanium oxide are 85% and 95% respectively.

*Example 2*

In the above furnace for chlorination the pulverized slags containing 78.0% $TiO_2$, 7.5% FeO and 6.5% $SiO_2$ are used. The powders mixed in the ratio of 90 slags to 10 charcoal are kneaded with 20% coaltar and formed into a briquette which is subsequently dried.

Such briquettes of 300 kg. are charged in the furnace and then heated up to 400° C., while the carbonic acid gas is fed. After the chlorine is substituted for said carbonic acid gas, the furnace is working for 10 days. During the period 7.6 tons chlorine and 5.2 tons slags were used with result that 8.5 tons titanium tetrachloride containing 91.4% $TiCl_4$ and 7.0% $SiCl_4$ was obtained and the consumption of electric power was 200 kwh. It tells that 0.98 ton chlorine, 0.67 ton slags (0.52 ton calculated as $TiO_2$) and 26 kwh. electric power were consumed for 1 ton titanium tetrachloride fraction of the raw titanium tetrachloride and that the percentages of the utilized chlorine and titanium oxide of the slags are 76% and 81% respectively, when the titanium tetrachloride fraction is taken into account.

What is claimed is:

Apparatus for manufacturing titanium tetrachloride comprising a vessel for containing liquid chlorine, a chlorination furnace lined with fire brick, a heating body of the class consisting of graphite and silicon carbide in said chlorination furnace, a quartz pipe covering said heating body, a conduit connecting said vessel with said chlorination furnace, a cover mounted on said chlorination furnace, a receiver and a gas discharging pipe thereof, a pump effective through said gas discharge pipe, a conduit connecting said receiver to said chlorination furnace, and a condenser operative in said receiver.

References Cited in the file of this patent

UNITED STATES PATENTS

| | | |
|---|---|---|
| 1,184,576 | Scherbel | May 23, 1916 |
| 1,263,906 | Lacy | Apr. 23, 1918 |
| 2,184,885 | Muskat et al. | Dec. 26, 1939 |
| 2,253,471 | Muskat et al. | Aug. 19, 1941 |
| 2,675,891 | Frey | Apr. 20, 1954 |
| 2,681,943 | Hartwick | June 22, 1954 |

OTHER REFERENCES

"Metal Transactions," vol. 185, November 1949, p. 786.
"Ind. and Eng. Chem.," September 1932, vol. 24, No. 9, p. 1022.
McPherson and Henderson: "General Chem.," 3rd ed., p. 408, Ginn and Co., New York.